United States Patent [11] 3,618,975

[72] Inventor Fred B. Bombach
 1821 Litchfield Ave., Dayton, Ohio 45406
[21] Appl. No. 868,166
[22] Filed Oct. 21, 1969
[45] Patented Nov. 9, 1971

[54] COMBINATION SEAT BELT AND SHOULDER HARNESS FOR AUTOMOTIVE VEHICLES AND THE LIKE
3 Claims, 2 Drawing Figs.
[52] U.S. Cl. .................................................. 280/150 SB, 297/389
[51] Int. Cl. ..................................................... B60r 21/00
[50] Field of Search ........................................... 297/385, 386, 387, 388, 389; 280/150 SB

[56] References Cited
UNITED STATES PATENTS

| | | | |
|---|---|---|---|
| 3,236,540 | 2/1966 | Berton et al. | 280/150 |
| 3,348,881 | 10/1967 | Weman | 280/150 X |
| 3,369,768 | 2/1968 | Burns | 297/388 X |
| 3,465,983 | 9/1969 | Taggart | 297/388 X |

FOREIGN PATENTS

| 1,375,094 | 9/1964 | France | 297/389 |
|---|---|---|---|
| 1,576,936 | 8/1969 | France | 297/389 |

Primary Examiner—Benjamin Hersh
Assistant Examiner—Winston H. Douglas

ABSTRACT: This invention consists of an ordinary seat belt embodying two straps that are buckled together over the lap of a person sitting in the seat of an automotive vehicle or the like; and a shoulder harness having one end riveted or otherwise secured to one of the aforesaid straps of the seat belt. The shoulder harness passes upward, around and down over a rotatably mounted pulley that is in the lower end of a pulley support. The aforesaid pulley support is swingably secured to a toggle bracket which is riveted or otherwise fastened to the underside of the roof of an automotive vehicle or the like. The rear and lower end of the aforesaid shoulder harness is now secured to a retrieving and storing pulley, after passing over the aforesaid pulley as previously stated, the retrieving and storing pulley being secured to the upper end of a vertically disposed strap that has its lower end firmly secured to the body of the aforesaid automotive vehicle or the like.

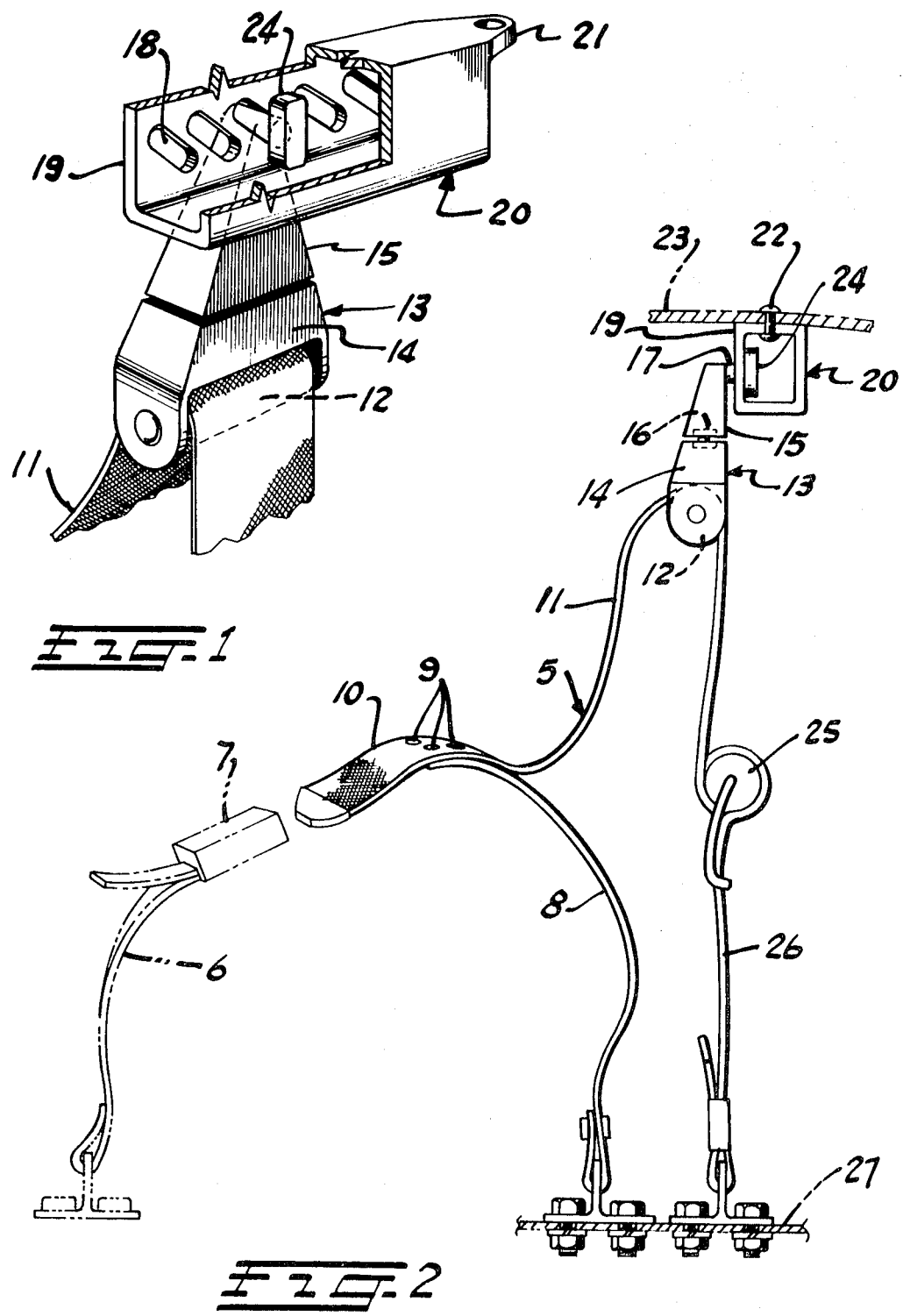

COMBINATION SEAT BELT AND SHOULDER HARNESS FOR AUTOMOTIVE VEHICLES AND THE LIKE

This invention relates to automotive vehicles and the like; more particularly, to safety equipment for use by occupants of an automotive vehicle; still more particularly, to safety equipment in the form of a combination seat belt and shoulder harness.

It has long been known by automotive engineers, whose business it is to design safety equipment for sue by persons driving or riding in a automotive vehicle or the like, that the use of seat belts will greatly reduce the number of injuries in an accident, and the use of a shoulder harness in combination with a seat belt will decrease the injuries still more. However, one of the drawbacks that has discouraged the use of seat belts and shoulder harness at the same time has been the necessity of separate buckles for both the seat belts and the shoulder harness.

It is therefore the principal object of this invention to provide a combination seat belt and shoulder harness for automotive vehicles and the like that has only one belt buckle for securing both the seat belt and the shoulder harness about ones person.

Another object of this invention is to provide a combination seat belt and shoulder harness for use in automotive vehicles and the like which embodies an automatically adjustable shoulder harness, as will hereinafter be described.

Still another object of this invention is to provide a combination seat belt and shoulder harness for use in automotive vehicles and the like that embodies a novel toggle pulley and mounting bracket that is located under the roof of the vehicle.

These and other objects and advantages of this invention will become apparent on reading the following description of this invention and examining the two view of the accompanying drawing in which:

FIG. 1 is a pictorial view of the toggle pulley and mounting bracket portion of this invention, the bracket being partly cut open in order to show its internal construction.

FIG. 2 a side view of this invention.

In the two view —s of the accompanying drawing, like parts of this invention are indicated by like reference numbers, the reference number 5 indicating this invention in its entirety.

Directing ones attention first to FIG. 2 of the accompanying drawing it will be seen that this invention 5 consists of a typical seat belt 6 embodying two straps and buckle 7. Since no claims are made for either the seat belt its buckle which are admittedly old, these two parts are shown in phantom lines in the drawing. One seat belt strap 8 is secured by a plurality of spaced rivets 9 to the outer portion 10 of the harness strap 11. The harness strap 11 passes over a pulley 12 that is mounted in the lower and open end of the pulley support 13. This novel pulley support 13 has a side configuration of an equilateral triangle and the end configuration of a trapezoid, as one can clearly see by examining FIG. 1 of the accompanying drawing.

The aforesaid pulley support 13 is actually made of a lower section 14 which is swingably secured to the upper section 15 by means of a rivet or the like 16. This two-piece novel construction of the pulley support 13 is best understood when one examines FIG. 2 of the drawing. A horizontally disposed pin 17 projects outward from the upper end and one side of the upper section 15 of the pulley housing 13 to pass through one of the angularly disposed openings 18 in the side 19 of the toggle bracket 20 of this invention. The just-mentioned toggle bracket 20 is a hollow rectangular metal casting or the like having a horizontally disposed and integrally formed lug 21 projecting outward from one end and the top side thereof in order to provide a means of securing the bracket to the underside of the roof of a vehicle or the like by means of a screw, bolt, or rivet 22 passing through the outer end of the lug, on through a structural member of the roof 23 of the vehicle. The aforesaid horizontally disposed pin 17 is prevented from coming out of the angularly disposed opening 18 in side 19 of the toggle bracket 20 by means of the rectangular lug 24 that is located on the end of the pin and which is obviously smaller in size than the opening 18, the aforesaid pulley support 13 being turned sideways on assembly with the toggle bracket so that the lug 24 may pass through the opening 18 and then the pulley support 13 is turned down in a vertical position thus locking the pulley support in the aforesaid toggle bracket 20, as will be understood be examination of the accompanying drawing.

The lower and rearward end of the aforesaid harness strap 11 encompasses, and is secured to, a retrieving and storing pulley 25 that is in turn secured to the upper end of the vertically disposed strap 26. Vertically disposed strap 26 has its lower end secured firmly to the body 27 of the vehicle in which this invention is placed.

The way in which this invention is used is obvious from examination of FIG. 2 of the drawing which shows that the invention is automatically adjusted to the wearer after the aforesaid pulley support 13 has been secured to the toggle bracket 20 by placing the horizontally disposed pin 17 in the desired angularly disposed opening 18, that is clearly shown in FIG. 1 of the accompanying drawing.

It is to be realized that this novel invention of a combination seat belt and shoulder harness is not to be limited to automotive vehicles but can also be used in airplanes or other vehicles having a cabin with a roof.

What I now claim as new and desire to secure by Letters Patent is:

1. A combination seat belt and shoulder harness for automotive vehicles and the like, comprising a seat belt to which is suitably secured a shoulder harness that is supported by structure which is secured to the underside of the roof of a vehicle as well as being secured by suitable means to the body of the same vehicle, the said structure which is secured to the underside of the roof comprising a pulley rotatably mounted in the lower and open end of a pulley support; and a toggle bracket, the said pulley support being swingably secured to the said toggle bracket by means of a horizontally disposed pin projecting outward from the back of the said pulley support and extending through an angularly disposed opening in the front side of the said toggle bracket, the said toggle bracket being rectangular in configuration and having an integrally formed, horizontally disposed lug extending outward from one end and the top side thereof, the said lug having a screw or bolt securing the said toggle bracket to the underside of the said roof of the said vehicle.

2. The invention of claim 1, wherein the said pulley support consists of a lower section, trapezoidal in shape, and an upper section that has a side configuration of an equilateral triangle, the said lower section being secured to the said upper section by means of a rivet or the like.

3. The invention of claim 2, wherein the means of securing the said harness strap to the said body of a vehicle is by having the lower and rear end of the said harness strap encompassing and securing a retrieving and storing pulley that is secured to the upper end of a vertically disposed strap that has its lower end firmly secured to the said body.

* * * * *